E. FRISCH & O. C. MIESSLER.
SANITARY WRAPPER FOR BREAD AND THE LIKE.
APPLICATION FILED MAR. 9, 1914.
1,168,254.
Patented Jan. 11, 1916.
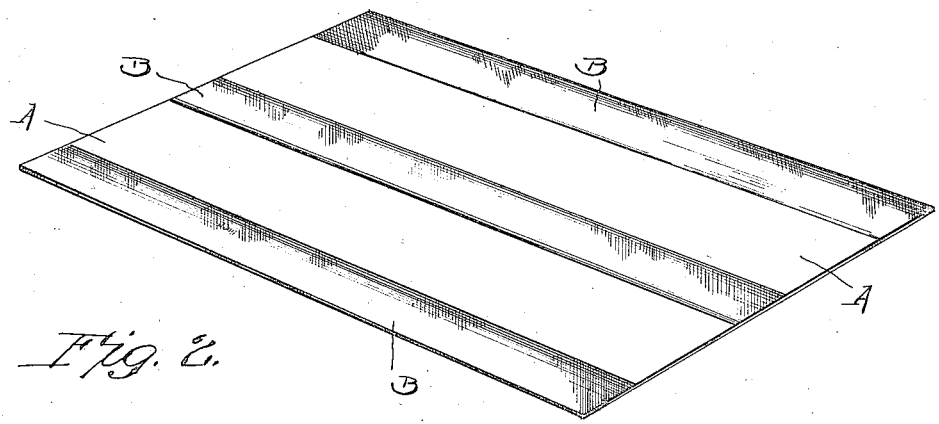
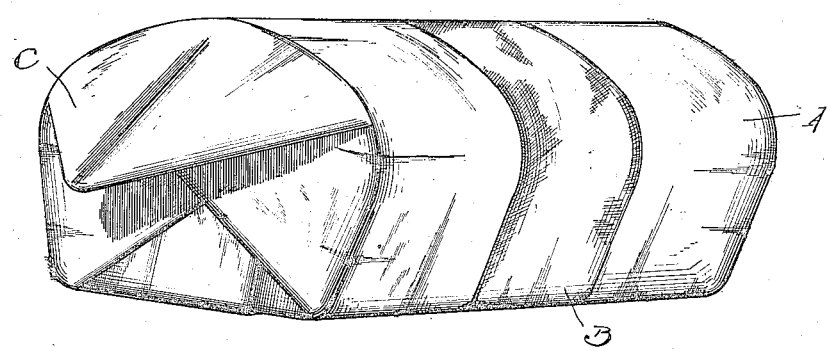
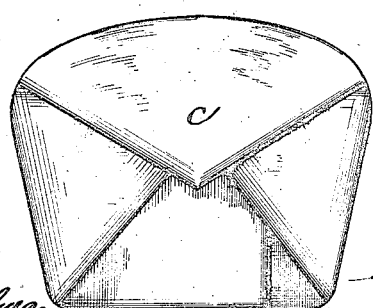

UNITED STATES PATENT OFFICE.

EMIL FRISCH AND OSCAR C. MIESSLER, OF CHICAGO, ILLINOIS.

SANITARY WRAPPER FOR BREAD AND THE LIKE.

1,168,254.　　　　Specification of Letters Patent.　　Patented Jan. 11, 1916.

Application filed March 9, 1914. Serial No. 823,337.

*To all whom it may concern:*

Be it known that we, EMIL FRISCH and OSCAR C. MIESSLER, citizens of the United States, and residents of Chicago, in the county of Cook and State of Illinois, have invented a new and useful Sanitary Wrapper for Bread and the like, of which the following is a specification.

Our invention relates to a sanitary wrapper for bakery goods, such as loaves of bread, rolls, and the like, and its object is to construct a wrapper of this character in such manner that the freshly baked commodity may be wrapped and sealed therein while still in a hot condition. As is well known, freshly baked commodities, if wrapped in an impervious or semi-impervious envelop, will sweat owing to the escape of a certain percentage of the moisture and gases that are liberated during the cooling of the bread. It is desirable that these vapors be permitted to escape from the package in order to avoid the same being again absorbed by the bread.

It is, therefore, an object of our invention to construct a sanitary wrapper that will, without destroying the integrity thereof, permit the escape of these vapors and at the same time will retain in the bread the proper amount of moisture to preserve it fresh for a considerable length of time.

The above and other objects we accomplish by the means and in the manner hereinafter fully described and as more particularly pointed out in the claims, reference being had to the accompanying drawings forming a part hereof, in which:—

Figure 1 is a perspective view of our improved wrapper laid out flat to illustrate its specific construction; Fig. 2 is a perspective view of a loaf of bread enveloped in said wrapper and ready to be sealed; Fig. 3 is an end view of the same showing the end flap folded and sealed against the package.

Referring to the drawings (particularly Fig. 1 thereof) A represents a substantially flat sheet of tissue, such as rice-paper or the like, that is preferably of rectangular shape and of a sufficient size to entirely envelop and inclose a loaf of baked bread in substantially the manner shown in Figs. 2 and 3 of the drawings. Extending either longitudinally or transversely across this sheet are a plurality of relatively broad parallel strips or bands B, preferably formed by impregnating the tissue with paraffin or similar waterproofing substance so as to render the treated portions thereof impervious to liquids. Between these strips or bands the tissue remains intact and being slightly porous will permit of the escape of a large percentage of the vapors cast off by the bread during the cooling thereof. It is desirable, as will hereinafter appear, that these paraffined portions are so arranged that two of the same will extend along the longitudinal edges of the tissue so that when the same has been wrapped around a loaf of bread these paraffined edges will preferably extend beyond the ends of the loaf and may then be folded upon themselves in the manner usually employed by bundle wrappers, leaving a substantially triangular shaped flap C to be folded upward against the ends of the package. When the package has been completed thus far it is passed through a metal trough of parallel plates, that is preferably wide enough to accommodate the enveloped loaf transversely therein, and which is heated to such an extent that as the package passes through the same the paraffin on the ends thereof and around the center, will melt sufficiently to knit and seal the folded parts of the tissue firmly together. This will seal the ends of the package and prevent the same unwrapping so that the commodity therein will be kept in a sanitary condition.

As before mentioned the bread is wrapped while freshly baked and hot and the vapors liberated therefrom will slowly pass out of the package through the unimpregnated portion of the tissue or else dry out as the bread cools.

Having described our invention, what we claim as new and desire to secure by Letters Patent is:—

1. A wrapper for baked commodities comprising a sheet of tissue provided with alternate longitudinally extending pervious and impervious sections.

2. A wrapper for baked commodities comprising a sheet of tissue provided with a plurality of alternate bands impregnated with paraffin.

3. A wrapper for baked commodities comprising a sheet of tissue provided with a plurality of alternate bands treated with a fusible impervious material.

In testimony whereof we affix our signatures in the presence of two witnesses.

EMIL FRISCH.
OSCAR C. MIESSLER.

Witnesses:
RAYMOND J. KELLY,
BENJ. T. ROODHOUSE.